United States Patent Office 3,428,771
Patented Feb. 18, 1969

3,428,771
PLASMA PRODUCING APPARATUS
Denis Cleaver, Saltburn, England, assignor to British Titan Products Company Limited, Billingham, Durham, England, a corporation of the United Kingdom
Filed Nov. 2, 1965, Ser. No. 506,109
Claims priority, application Great Britain, Nov. 20, 1964, 47,328/64
U.S. Cl. 219—10.51    10 Claims
Int. Cl. H05b 5/08, 9/02

ABSTRACT OF THE DISCLOSURE

In devices for the production of hot gaseous plasmas by induction heating, the gas confining tubes are generally constructed of electrically-insulating and heat-resisting materials such as silica. Metal tubes would be desirable for any of a number of reasons but due to the resulting eddy currents in the operation of the plasma forming apparatus, metal tubes become unduly heated and are, therefore, unsatisfactory. It has now been found that by longitudinally dividing electrically-conducting gas confining tubes by electrically-insulating materials and by constructing the wall of such thickness that excessive heating is avoided, electrically-conducting tubes e.g. metal tubes may be employed in plasma forming processes and apparatus.

---

Figure 1:
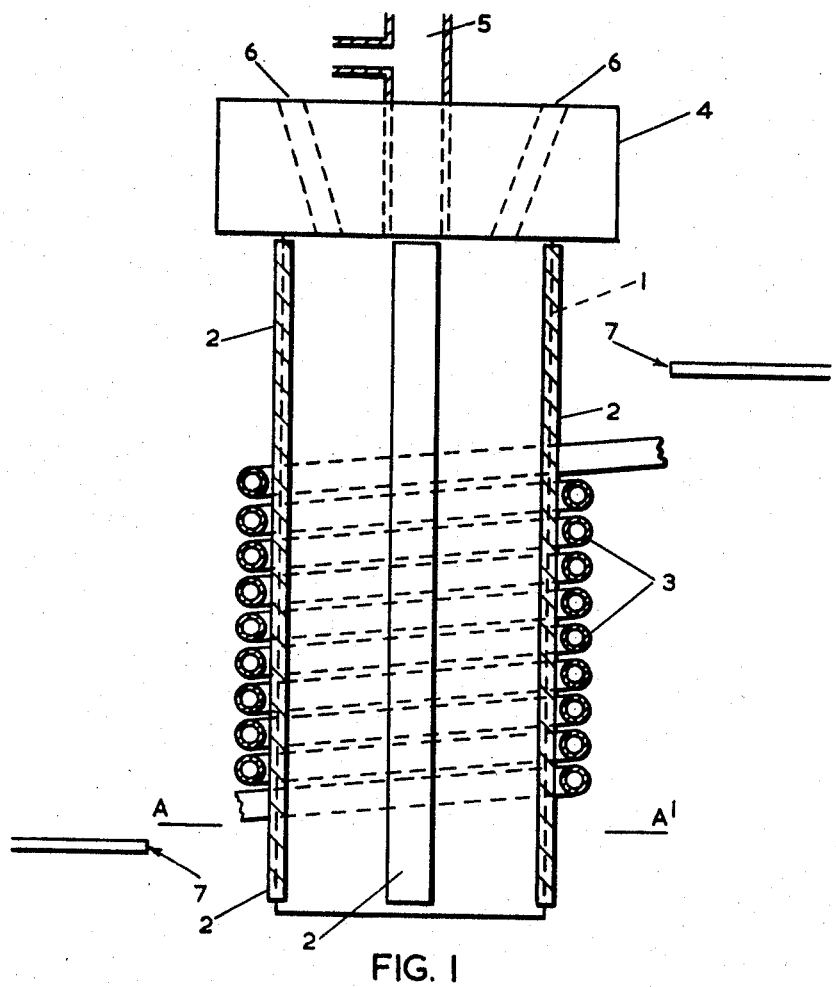

The present invention relates to improved apparatus and process for the production of hot gaseous plasmas by induction heating.

Hot gaseous plasmas are commonly produced within a confining tube of electrically insulating and heat resisting material, for example of fused silica (quartz), by means of a coil of electrically-conducting material, for example of copper tube, around the exterior of the confining tube. The ends of the coil are connected to a source of suitable oscillatory current having a frequency of between about 200 kc. to 50 mc./s. and particularly one of between about 1 mc. and 10 mc. per second.

The coil may be formed of metal tubing, for example of copper, and cooled by the circulation of a gas or liquid through it. The coolant may be water or one of the materials which are subsequently passed through the plasma, in order to make efficient use of the heat generated in the coil.

Tubes of electrically-insulating and heat-resisting material, for example of silica, are generally mechanically weak and unsuitable for use where vibration is present or where considerable handling of the tube is necessary, owing to the danger of breakage. Furthermore, such tubes of large diameter are difficult and expensive to obtain and are excessively heavy due to the thickness of the wall required to give the necessary mechanical strength.

Tubes of metal would clearly be more suitable from the point of view of increased mechanical strength, lightness and availability but hitherto they have suffered from the disadvantage that, when placed within a coil through which an oscillatory current suitable for producing and maintaining a hot gas plasma, the wall of the tube is heated to a high temperature due to the formation of eddy current within the metal and the metal may melt.

It is an object of the present invention to provide apparatus and processes whereby such heating is reduced or eliminated.

Accordingly, the present invention is an apparatus for the production of a hot gas plasma comprising a gas-confining tube around which are coils of electrically-conducting material, the ends of which are adapted to be connected to a source of oscillatory current, characterised in that the wall of the gas-confining tube is of electrically conducting material divided longitudinally by an electrically-insulating material and the thickness of the wall is such that the wall is not excessively heated by the passage of the oscillatory current through the coil.

The invention is also a process comprising passing an oscillatory current through a coil or coils of electrically-conducting material around a gas-confining tube through which is passed a gas, thereby inductively heating the gas to form a hot gas plasma and wherein the wall of the gas-confining tube is of electrically-conducting material divided longitudinally by electrically-insulating material and is of such thickness that it is not excessively heated by the passage of the oscillatory current.

The electrically-conducting material of the confining tube is normally a metal, for example copper or stainless steel, although other metals may also be suitable.

The tube may be divided longitudinally by only one insertion of electrically-insulating material but it is preferred to provide two or more insertions of insulating material for the best results. Conveniently, the insertions may be at diametrically opposite sides of the tube.

It is not necessary that the insertion(s) of electrically-insulating material should extend over the whole length of the tube, although such insertion(s), may be convenient in practice. The insertion(s) may, if desired, only extend along that portion of the tube covered by the coils carrying the oscillatory current.

The insertion(s) of insulating material may be of any material having a high dielectric strength, at the frequencies of oscillatory current used, and which will resist the temperature produced during the operation of the apparatus. A particularly suitable material is boron nitride since it has the necessary electrically-insulating and heat resistant properties and can be accurately formed, for example by machining.

It is believed that the insertion(s) of insulating material according to the present invention serves to interrupt the path of the eddy currents which would flow around the wall of the gas-confining tube in their absence when the apparatus is in operation, thereby reducing or eliminating the heating effect of the metal tube by such eddy currents.

In addition to the provision of insertion(s) of insulating material it is also necessary to ensure that the wall of the gas-confining tube between the insertions is of insufficient thickness to give rise to excessive heating of the wall.

It has been found that excessive heating of the wall does not occur if the wall of the tube is relatively thin in relation to the Reference Depth.

The term Reference Depth may be calculated by the formula:

Reference Depth $= \dfrac{1}{2\pi} \sqrt{\dfrac{e}{\mu f}}$ cms. $= 0.063 \sqrt{\dfrac{e}{\mu f}}$ inches where $e$ = the resistivity of material (e.m.u.)
$f$ = the frequency of magnetic field (in cycles/sec.)
$\mu$ = the effective permeability of the tube material.

It will be seen that the Reference Depth *decreases* with increased frequency and *increases* with increased resistivity of the material.

Generally, the thickness of the wall of the gas-confining tube should be as thin as possible consistent with retention of the necessary mechanical strength for its purpose. Ideally it should approach as nearly as possible a thickness equal to the Reference Depth under the particular conditions of operation. For some materials under normal conditions of operation, however, a tube having a wall thickness equal to the Reference Depth would have insufficient mechanical strength in practice.

The use of gas-confining tube having as thin a wall as possible is also of advantage in that such tubes provide the minimum screening of the magnetic field existing between the coil(s) carrying the oscillatory current and the gas plasma.

In the present state of the art relating to the production of hot gas plasmas an oscillatory current of a frequency from 1 to 10 mc. per second is generally used and commonly one of about 4 mc. per second. Under these conditions, copper and non-magnetic stainless steel are very convenient materials from which to make the gas-confining tube. Such materials differ widely in their resistivities, since copper has a resistivity of about 0.68 microhm/inch while that of the stainless steel is about 29 microhm/inch.

The Reference Depths for these materials, when used with an oscillatory current having a frequency of 4 mc. per second, are about 0.0015" and 0.01", respectively, for copper and the stainless steel.

Ideally, therefore, the wall thickness of the gas-confining tube should be less than 50 gauge copper and 33 gauge stainless steel. However, materials of these thicknesses are not necessarily preferred owing to their lack of mechanical strength and, in practice, material of about 22 gauge has been found to be a convenient and acceptable compromise. Where frequencies lower than about 4 mc. per second are used the Reference Depth is, of course, greater than those given above.

When using gas-confining tubes according to the present invention it is desirable that they be cooled, for example by a fluid coolant in heat exchange relationship. This may be accomplished by blowing air upon the outer surface of the tube but if a greater degree of cooling is required, two concentric tubes of different diameter, made according to the present invention, may be used and a liquid or gaseous coolant may be circulated through the space between the tubes. It should be noted that with oscillatory currents of the frequencies here contemplated, water is a poor conductor and this can be used as a coolant, if desired.

The accompanying drawings show one embodiment of the present invention.

Figure 2:
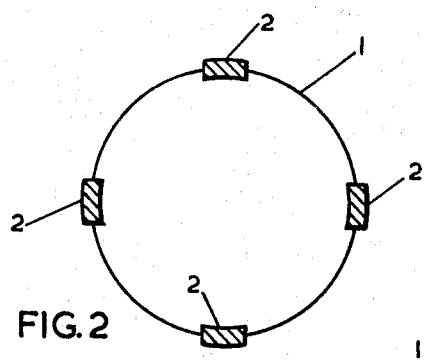
Figure 3:
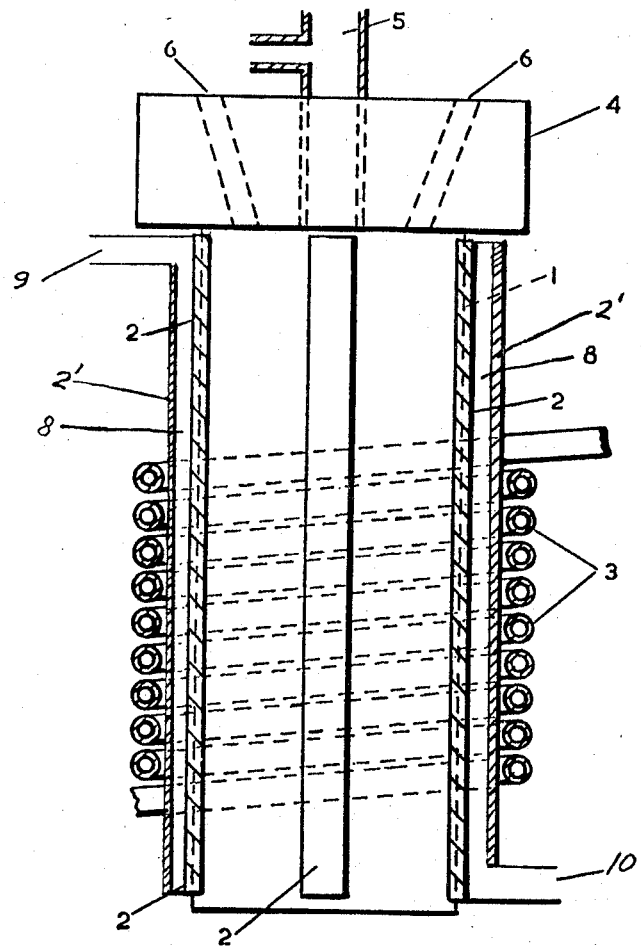

FIGURE 1 is a diagrammatic side view of the apparatus and FIGURE 2 a plan view of section AA' of FIGURE 1. FIGURE 3 is a diagrammatic side view of a modified form of the apparatus.

In FIGURE 1 the tube 1 is 2" internal diameter and is made of 22 gauge copper. The walls are longitudinally divided by four boron nitride strips 2. Placed around the tube is a 10-turn coil of copper tube 3 which, in operation, is connected to a source of oscillatory current (not shown).

Gases are introduced into the tube through the injection head 4 of polytetrafluoroethylene. The gas which is to be heated to form the plasma is introduced through inlet 5 and further gas through the tangential inlets 6 which has the effect of stabilising the plasma.

Provision is made for air cooling of the tube by directing streams of air 7 upon the outer surface.

In a modified version of the apparatus of FIGURE 1, cooling tubes 7 are omitted. Intermediate the coils of copper tube 3 and the tube 1 is a cooling chamber. Cooling chamber 8 is provided with electrically insulating inserts 2' (corresponding to inserts 2 in the gas confining tube) for the purpose of minimizing eddy currents in the cooling chamber material. Suitable cooling fluid is passed through inlet 9 and removed from cooling chamber 8 at exit 10.

The following examples show various embodiments of the present invention.

*Example 1*

An apparatus similar to that described above was set up and argon at a rate of 3 litres/min. was introduced through the central inlet and more argon (as stabilising gas) was introduced through the tangential inlets at a rate of 6 litres/min.

A suitable oscillating current at a frequency of 3 mc. per second was passed through the coil and a tungsten metal rod was inserted into the tube to produce the necessary ion density for the initiation of the plasma. When the plasma had been initiated the argon flow rate through the tangential inlet ports was increased to 35 litres/min. and the frequency of the current was increased to 6 mc. per second and the voltage of 6 kv.

The plasma was maintained without overheating of the tube.

*Example 2*

An apparatus similar to that described in Example 1 was set up but two copper gas-confining tubes of 22 gauge material and 2" in diameter were used.

(a) One tube had *no* inserts and was therefore not made according to the present invention.

(b) The other tube had 2 diametrically opposed boron nitride inserts ¼" x ¼" in size. One strip extended for the whole length of the tube and the other was shorter extending only over that part of the tube covered by the coils. This tube was, therefore, made according to the present invention.

Current was passed through the coil in the *absence* of the gas-confining tube and the values, particularly the anode current, were noted. The current was switched off and one of the gas-confining tubes was inserted into the coil and the current was again passed (at the same settings). The values were again noted. This was repeated with the other gas-confining tube.

The difference in the anode current in the absence and presence of the gas-confining tubes is a measurement of the amount of energy absorbed by the tube and therefore of the heating effect on the tube.

The following results were obtained.

Tube without inserts  Anode reading
(a) Without tube in coil _____ 5 kv. 1.8 amps
(b) With tube in coil _____ 5 kv. 2.6 amps Difference in anode current =0.8 amp which is a measure of the energy absorbed by tube.

Tube with 2 inserts
(a) Without tube in coil _____ 5 kv. 2.0 amps
(b) With tube in coil _____ 5 kv. 2.1 amps Difference in anode current=0.1 which is a measure of the energy absorbed by tube.

It will be seen, therefore, that the energy absorbed by the tube with 2 inserts according to the present invention is substantially less than that of a tube without inserts.

What is claimed is:

1. An apparatus for the production of a hot gas plasma comprising a gas-confining tube around which is at least one coil of electrically-conducting material and the ends of which are adapted to be connected to a source of oscillatory current, characterised in that the wall of the gas-confining tube is of electrically-conducting material divided longitudinally by an electrically-insulating material and the thickness of the wall is such that it is not excessively heated by the passage of the oscillatory current through the said coil.

2. An apparatus as claimed in claim 1 wherein the electrically-conducting material of the wall of the gas-confining tube is a metal.

3. An apparatus as claimed in claim 2 wherein the electrically-conducting material is selected from the group consisting of copper and stainless steel.

4. An apparatus as claimed in claim 1 wherein the wall of the gas-confining tube is divided longitudinally by at least two inserts of electrically-insulating material.

5. An apparatus as claimed in claim 4 wherein the inserts of electrically-insulating material are diametrically opposed.

6. An apparatus as claimed in claim 1 wherein the insert(s) of electrically-insulating material extends at least along that portion of the gas-confining tube wall covered by the said coil carrying the oscillatory current.

7. An apparatus as claimed in claim 1 wherein the electrically-insulated material is boron nitride.

8. An apparatus as claimed in claim 1 wherein means are also provided to pass a fluid in heat exchange relationship with the walls of the gas-confining tube.

9. An apparatus as claimed in claim 8 wherein the gas-confining tube is surrounded, within the said coil, by a second tube of electrically-conducting material of greater internal diameter than that of the external diameter of the gas-confining tube and which is also longitudinally divided by at least one insert of electrically-insulating material and the thickness of the wall is such that it is not excessively heated by the passage of the oscillatory current through the said coil, and means for passing a liquid or gaseous coolant between the tubes.

10. A process comprising passing an oscillatory current through at least one coil of electrically-conducting material around a gas-confining tube through which is passed a gas, thereby inductively heating the gas to form a hot gas plasma, wherein the wall of the gas-confining tube is of electrically-conducting material divided longitudinally by electrically-insulating material and is of such thickness that it is not excessively heated by the passage of the oscillatory current.

References Cited

UNITED STATES PATENTS 3,277,265  10/1966  Reboux _____ 219—10.49

FOREIGN PATENTS 141,351  5/1951  Australia.
787,125  12/1957  Great Britain.

RICHARD M. WOOD, *Primary Examiner.*

L. H. BENDER, *Assistant Examiner.*

U.S. Cl. X.R.

219—10.49